United States Patent [19]

Cogliano

[11] 4,273,100
[45] Jun. 16, 1981

[54] PASSIVE SOLAR HEATING AND COOLING PANELS

[75] Inventor: Joseph A. Cogliano, Baltimore, Md.

[73] Assignee: W. R. Grace & Co., New York, N.Y.

[21] Appl. No.: 12,733

[22] Filed: Feb. 16, 1979

[51] Int. Cl.$^3$ .......................... F24J 3/02; F28D 15/00
[52] U.S. Cl. ............................. 126/433; 165/104.14; 165/104.17; 165/104.21; 126/430; 126/436; 126/428
[58] Field of Search ............... 126/433, 434, 419, 422, 126/423, 430, 436, 446, 428, 417; 165/105, 96, 32

[56] References Cited

U.S. PATENT DOCUMENTS

| 2,504,588 | 4/1950 | Rinia .................................. 165/105 |
| 2,595,905 | 5/1952 | Telkes ................................ 126/435 |
| 2,677,664 | 5/1954 | Telkes ................................ 126/400 |
| 3,229,759 | 1/1966 | Grover ............................... 165/105 |
| 3,688,838 | 9/1972 | Sturm et al. ....................... 126/400 |
| 3,776,304 | 12/1973 | Auerbach ............................ 165/96 |
| 3,837,394 | 9/1974 | Roberts, Jr. ....................... 165/32 |
| 3,875,926 | 4/1975 | Frank ................................. 126/433 |
| 3,996,919 | 12/1976 | Hepp ................................. 126/433 |
| 4,007,777 | 12/1977 | Sun et al. ......................... 165/105 X |
| 4,008,579 | 2/1977 | Horvay .............................. 62/183 |
| 4,058,160 | 11/1977 | Corman et al. .................... 165/105 |
| 4,064,932 | 12/1977 | Iriarte ............................... 165/105 |
| 4,067,315 | 1/1978 | Fehlner et al. .................... 165/105 X |
| 4,068,652 | 1/1978 | Worthington ..................... 126/436 |
| 4,119,085 | 10/1978 | Knowles et al. .................. 126/433 |
| 4,131,158 | 12/1978 | Abhat et al. ...................... 126/435 |

OTHER PUBLICATIONS

Modeling of a Heat-Pipe Operated Thermal Storage Device Yang et al.
Heat of Fusion Systems for Solar Energy Storage Lane et al.
Storage of Solar Heating/Cooling, Telkes, ASHRAE Transactions, 1974.
Heat Pipes Applied to Flat Plate Solar Collectors, Final Report by W. B. Bienert et al., May 1976.
Heat Pipes Applied to Flat Plate Solar Collectors, Annual Progress Report, W. B. Bienert et al., Jan. 31, 1975.
Heat Pipes in Flat Plate Solar Collectors, W. B. Bienert et al., 12/5/1976.
Application of Heat Pipes to Solar Collectors, Report No. 759224, Bienert et al.

Primary Examiner—James C. Yeung
Assistant Examiner—Larry Jones
Attorney, Agent, or Firm—Edward J. Cabic

[57] ABSTRACT

A heat pipe is used to transfer heat from an outside solar panel into a building where the heat can be stored in a heat absorber. Various heat pipe structures are disclosed where the pipe passes through the wall of the building and where it has an end portion thermally contacting the solar panel. Heat transfer can be stopped by rotating the heat pipe, by the use of plungers and trap chambers in the pipe or by specially designed heat pipes that can be easily removed. The heat pipe can also be used to remove heat from the inside to the outside. The inside end portion of the heat pipe is in thermal contact with a heat absorber inside the building which contains a phase change material. Modular wall units can also be made having the solar panel and heat absorber integral on each side of the wall with the heat pipe in between.

30 Claims, 15 Drawing Figures

PASSIVE SOLAR HEATING AND COOLING PANELS

BACKGROUND OF THE INVENTION

1. Field of the Invention

The present invention relates to the use of a heat pipe coupled with a solar panel to transfer heat in and out of a building such as a house and the combination with a heat storage unit to store the solar heat in the building.

2. Description of the Prior Art

The use of heat pipes to transfer heat has been known. Generally a heat pipe may be defined as a closed container housing a vaporizable liquid as the heat transfer medium. The heat transfer medium is evaporated at one location by absorption of heat and condensed at another location by the extraction of heat. The condensed liquid is returned to the heat absorption portion either by gravity or by a wick.

The use of a heat pipe to transfer heat from one enclosure to another is shown in U.S. Pat. No. 4,064,932. There heat pipes are angularly mounted on a rotating holding device with the pipes at a fixed angular offset from the axis of the rotating holder. By rotating the holder the lower side of the heat pipes will always be in the warmer enclosure and the liquid will flow down to this lower end by gravity. This heat transfer unit requires the holding device and the means to mount the holding device so that it can rotate at an angular inclination.

Solar energy has also been used to provide heat to be transferred inside a building. One mode of operation is to have the sun's rays warm a panel. A liquid flowing in contact with the panel absorbs the heat from the panel and the liquid is then pumped inside the building where the heat content can be stored.

In U.S. Pat. No. 4,119,085 the sun's rays are directed to a solar energy collector which is one end of a heat pipe. The solar heat produces a vapor which is transferred to the other end of the pipe where it condenses. The heat released will be transferred into the building by a liquid that flows from the heat producing condensation zone of the heat pipe to the inside of the building. Such a system requires this additional fluid circuit, the losses in heat transfer to the liquid from the heat pipe and a pump to maintain the fluid circulating.

It is an object of the present invention to use solar energy to provide heat inside a building while eliminating the use of a circulating fluid which is heated on the outside of the building and then pumped to the inside of the building.

It is a further object of the invention to utilize a passive heat pipe to deliver heat to the inside of a building where it can be stored in a heat storage unit.

It is a further object of the invention to utilize a reversible heat pipe which can transfer heat to the inside in the winter and transfer the heat to the outside in summer for cooling by merely rotating the heat pipe.

It is a further object of the invention to provide a solar energy transfer device which can be readily inserted in a building and which can be removed when it is no longer required.

It is still a further object of the invention to provide a heat pipe having a cylindrical portion where it is possible to turn off the heat pipe by merely rotating the pipe so as to prevent the flow of fluid in the pipe.

It is another object of the invention to provide a heat pipe that can be turned on and off to prevent the flow of fluid in the pipe without having to rotate the pipe.

It is a further object of the invention to provide a heat pipe for transferring solar energy from the outside of a building to the inside of a building where the transferred heat is released to the inside heat absorber.

It is a further object of the invention to have the heat absorber for storing heat in the form of a plurality of layers of a crystallizable substance where each layer is separated from the other by a heat conductive metal tray.

It is a further object to provide a modular wall unit in which the solar panel forms one side of the wall, and the heat absorber forms the other side of the wall. The space between the two is filled with an insulating material and there is at least one controllable heat pipe to transfer heat back and forth.

Other objects, aspects and advantages of the present invention will be apparent when the detailed description is considered with the drawings.

SUMMARY OF THE INVENTION

This invention relates to a passive solar energy heat transfer system by which heat from solar radiation can be transferred inside a building using a specially constructed heat pipe in combination with a solar panel. In a similar manner, heat stored in a heat absorber inside the building can be transferred to the outside via the heat pipe to cool the building.

In one of the most streamlined structures, the solar panel is spaced from the outside wall of the building and a heat pipe having an expanded end is inserted through the solar panel, through an opening in the wall and into an inside heat absorber with the expanded end of the heat pipe in thermal contact with the front side of the solar panel. Heat generated on the solar panel by the sun's rays is transferred to the liquid collected in the expanded end portion of the heat pipe. The liquid vaporizes and the vapor flows to the inside end of the pipe where upon condensing the heat given off is transferred to the inside heat absorber. This embodiment permits the easy removal of the heat pipe when it is no longer desired to transfer heat inside the building.

In another embodiment a heat pipe is inserted through an opening in a wall of a building with the outside end portion of the heat pipe bent at a 90° angle to the middle portion. This bent outside end portion is placed in thermal contact with the back side of a solar heating panel while the inside end of the heat pipe can be inserted into a heat absorber such as the type containing a phase change chemical composition that absorbs heat and becomes liquid upon heating. Later, when the temperature of the absorber drops, the composition cools and undergoes a phase change to the solid state and gives off heat as the heat of crystallization or possibly as a heat of hydration when it cools to the solid form.

In operation the middle portion of the heat pipe passing through the wall is horizontal and the heat pipe is rotated so the outside bent end portion is pointing down. This permits the condensed fluid to collect in the outside end and be vaporized by the heat generated in the adjacent solar panel. The vapor flows to the inside end where it condenses and transfers heat to the inside heat absorber. To stop heat transfer, the heat pipe can be rotated so the bent end portion is either pointing horizontally or higher. This prevents the fluid from collecting in the outside end. Another way to stop that transfer is to remove the heat pipe by withdrawing it through the opening in the wall.

Further features of the basic heating system include providing a protective layer over the surface of the solar panel to prevent heat loss by wind convection and adding insulation around the back side of the solar panel and the bent outside end portion of the heat pipe to prevent heat losses. Operation of the heat pipe can also be stopped by adding plates or other irregularities to a section of the internal surface of the middle portion of the heat pipe. When the heat pipe is rotated so that the section of these plates is on the bottom, the plates will prevent the condensed liquid from flowing back to the outside end so there eventually will not be any fluid at the hot, outside end to vaporize.

In another embodiment the heat pipe can be bent at both end portions and rotated from one position which permits heat to be transferred to the inside to a second position that permits the heat to be transferred to the outside. An example of this embodiment uses a heat pipe having its two end portions each bent perpendicular to the middle portion, but with the two end portions extending in opposite directions. When the heat pipe is oriented with the outside end portion pointing down, the fluid will collect outside and heat will be transferred to the inside. When the pipe is rotated so the inside bent end portion is pointing down, then the fluid will collect on the inside where it can be vaporized to transfer heat to the outside to cool the building. The double bent heat pipe can also have the internal plates or disruptions at a position intermediate the two liquid flow paths in each direction to stop the flow of liquid when the heat pipe is rotated so these plates are on the bottom position of the pipe. With the fluid flow stopped, the heat transfer operation of the pipe will also stop.

A further feature of the double bent heat pipe is that it can also have an extension piece extending into the heat absorber to further facilitate heat transfer to the inside of the absorber.

The heat absorber is designed to have a plurality of metallic, conductive trays to provide better heat transfer to the heat storage material inside and to assist in preventing the phase change composition from settling out so that it would not act as efficiently in future cycles. The outside surface of the heat absorber that will be in contact with the bent end portions of the heat pipe can have an extra outside metal layer thereon to facilitate the heat transfer between the end portion of the heat pipe and the absorber.

In the embodiment where the heat pipe is to be inserted inside the heat absorber, a conductive element can be inserted along the length of the absorber to conduct the heat from the inserted heat pipe throughout the absorber. Another embodiment has the heat pipe entering at near the bottom of the absorber and a second heat pipe vertically oriented in the absorber which transfers the heat from the first solar connected heat pipe throughout the entire absorber.

To facilitate heat transfer between the flat surface of the back of the solar panel and the flat outside heat transfer surface of the heat absorber, the bent end portion of heat pipe can be constructed with a flat configuration on one side so that the cross-section of the end portion resembles a half moon with the flat side in contact with the solar panel or the heat absorber.

Other features of the invention include reducing the small conductive heat losses through the heat pipe by fabricating the middle portion of the heat pipe out of a material that has a lower thermal conductivity than the more heat-conducting material of the end portions. The heat pipe can be rotated either manually at each end or various mechanical drives can be connected such as a chain and sprocket.

To facilitate the boiling and vaporization of the fluid in the heated end of the heat pipe, one embodiment employs a wicking material in the end portion region where heat is being transferred to the fluid to provide uniform heat distribution into the fluid to reduce uneven heating and non-uniform boiling.

Another feature of the invention is the utilization of a trap chamber and a moveable plunger device at various locations in the heat pipe to control the flow of fluid which in turn controls the operation of the heat pipe without the need to rotate the pipe.

Another feature of the invention is a modular wall construction in which the solar panel and the heat absorber are made into an integral wall. Various types of heat pipes described above can be used in this modular structure to transfer the heat from one side to the other.

DESCRIPTION OF THE SPECIFIC EMBODIMENTS

Figure 1:
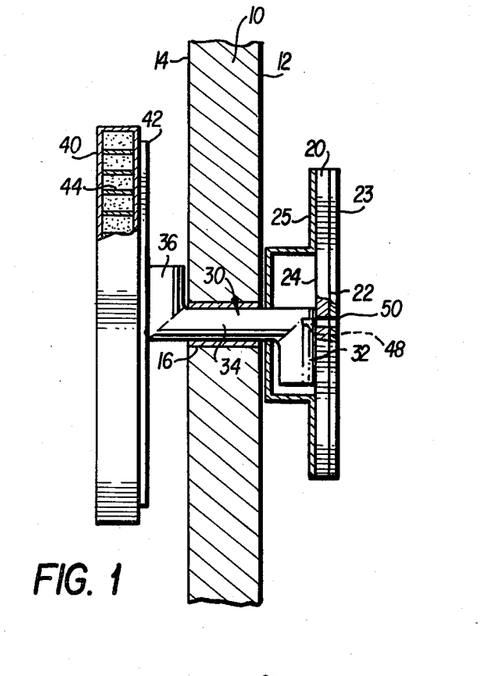
FIG. 1 is a cross-sectional view through a wall showing the heat pipe positioned for heating in the winter.

In FIG. 1 the wall 10, which could be the wall of a building such as a house, has an opening 16 through which is inserted the heat pipe 30. Suspended from the outside wall surface 12 is a thermally conductive outside heat absorber 20 which can be a solar heat panel with a front surface 22 exposed to the sun and a back side 24. Heat is generated in this unit 20 from the impinging solar energy and the heat flows to the back side surface 24.

An optional feature shown in FIG. 1 is a protective barrier placed around the solar heat panel to prevent heat loss due to wind convection currents. This protective barrier would be used in winter when it is desired to transmit all of the sun's rays striking the solar panel into the heat pipe. The protective barrier can be a glass layer 23 over the front surface 22 and an insulating material 25 such as glass fiber insulation over the back side 24. To prevent heat loss through the glass, the glass plate 23 can be spaced from the front surface 22 to form an air space between them to prevent conductive heat losses from the solar panel 20 to the glass surface. In the summer these protective layers can be removed to facilitate removal of heat from the panel.

The heat pipe 30 extends through the opening 16 in the wall 10 with a middle portion 34 in a generally horizontal position. On the outside of the wall the end of the heat pipe 32 extends downwardly at a right angle to the middle portion 34. This extending end 32 is in heat transferring conductive contact with the back side 24 of the thermally conductive outside heat absorber 20. The other inside end 36 of the heat pipe also extends away from the main body 34 at a right angle of 90°. In other words, the two ends are arranged with respect to a middle axis extending axially along the length of the middle portion of the heat pipe and to a plane passing through said axis so that one closed end extends perpendicularly above the plane while the other closed end extends perpendicularly to the axis and below the plane. In the preferred embodiment the two end portions are arranged at an angle of 180° from each other. Spaced from the inside wall 14 is a heat absorber 40 to absorb the heat being brought inside.

One form of this heat absorber is a container having a fuseable salt therein that will absorb the heat. For example, it can be a heat storage material as disclosed in U.S. Pat. No. 2,677,664 containing about 1-5 percent borax and the balance Glauber's salt, which is a hydrated sodium sulfate with a possible small amount of corrosion inhibitor. A further suitable composition is one used at MIT, which is also based on Glauber's salt, containing 38 percent anhydrous sodium sulfate, 3 percent borax, 8 percent common salt, 3 percent Cab-O-Sil fumed silica and 48 percent water as reported in Chemical Week Mar. 1, 1978. This composition has a melting point of 73° F. which produces a more comfortable room temperature than without the salt, since the melting point of Glauber's salt alone is 88° F.

Other compositions are described by M. Telkes in "Storage of Solar Heating/Cooling" in ASHRAE TRANSACTIONS, vol. 80, part 2, 1974. The "Proceedings of the Workshop on Solar Energy Storage Subsystems for the Heating and Cooling of Buildings" held in 1975 is a collection of papers disclosing many materials. See especially the paper "Heat-of-Fusion Systems for Solar Energy Storage" by G. Lane et al, which discusses 205 candidate compositions.

On the side of this container facing the inside wall 14, can be a layer 42 of a thermally conducting material which will be in contact with the end portion 36 of the heat pipe 30. This layer 42 increases the degree of heat transfer between the end of the heat pipe and the heat chamber.

The size of the heat pipe is not critical. Heat pipes of standard dimensions such as about one-quarter inch to one inch diameter are acceptable since the heat is being transferred by vapor transport through the hollow tube. To achieve good conduction of heat between the end portions 32 and 36 and the inside and outside heat absorbers, these end portions can be made of a good thermally conducting metal such as copper.

In operation of the device in FIG. 1 the sun's rays impinge upon the outside surface 22 of the thermally conductive heat absorber 20, and the solar energy is converted into thermal energy which transfers by conduction to the end portion 32 of the heat pipe. All the liquid in the heat pipe will be in the lower end portion 32 due to gravity. This liquid is vaporized by the heat transferring into the end portion 32 of the heat pipe. The vapor flows upwardly and to the opposite end 36 of the heat pipe where the vapor condenses and transfers its heat content by thermal conduction to the inside heat absorber 40 where the composition in the absorber is converted to the liquid phase. After the vapor has condensed in the inside end portion 36 the liquid will flow by gravity down through the middle portion 34 of the heat pipe and back to the lower end 32 where it can once again be vaporized. Because of the gravity return, the tube does not require any wicking material through which the fluid transfers from one end to the other.

In this device the heat transfer liquid is always being maintained or stored in one of the end portions 32 or 36, depending on which end portion is extending downwardly. In FIG. 1 the liquid will be in end portion 32 because this is the lowest part of the pipe enclosure and there will essentially not be any liquid in the upper portion 36. Thus at night when the inside of the building is at a warmer temperature than the outside, there will not be any appreciable heat loss from the heat absorber 40 through the heat pipe to the outside because there will not be any liquid in the upper inside end portion 36 to be vaporized. As a result, when the heat pipe is arranged in the configuration shown in FIG. 1 it will only permit heat to be transferred in one direction, from the outside to the inside, which is from right to left as shown in the figure. Meanwhile during the night the liquid composition in the heat absorber can solidify and give off its heat of crystallization or heat of hydration to the inside of the building to keep the building warm.

Figure 2:
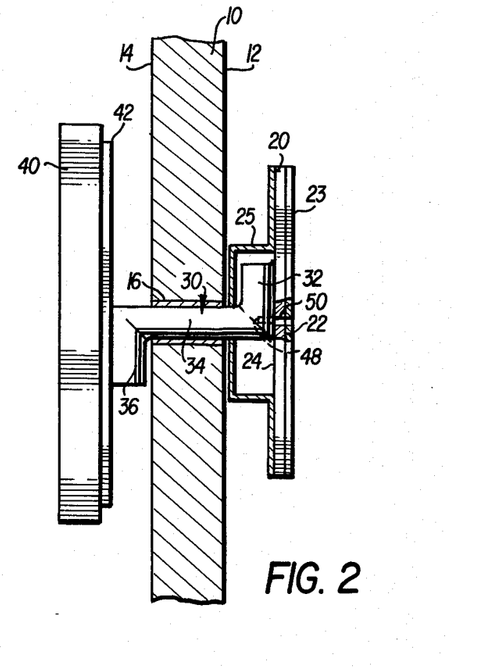
FIG. 2 is the same view as FIG. 1 showing the heat pipe positioned for cooling in the summer.

FIG. 2 shows the same structure as in FIG. 1, but in this case the heat pipe has been rotated 180° so that the inside end portion 36 of the heat pipe is now in the lowest position, with the opposite end portion 32 on the outside extending upward. In this configuration the liquid will be settled in the lower end portion 36. Thus the liquid will only vaporize and heat will only be transferred from the inside end portion 36 to the outside 32 using the same vaporization and condensation procedure discussed above relating to FIG. 1. In the summer, even though the outside heat absorber surface 22 becomes hot from the solar rays, there will be no liquid present in the upwardly extending end portion 32 so there will be no vapor generated which would cause heat to flow into the house. Instead, at night when the house is warmer than the outside surface 22, the heat from the inside heat absorber 40 will vaporize the liquid in the lower end portion 36 and cause the vapor to flow to the outside where it will condense in the upper end portion 32. The heat of condensation will then transfer by conduction to the outside thermally conductive heat absorber and finally be transferred into the air from the surface 22 either by convection or radiation or transferred into cooling water which is applied to surface 22. The transfer of heat from the inside to the outside will cool the building.

In this embodiment in FIG. 2 there will not be any wind-insulating glass cover over the solar panel since the panel now serves the function of a heat radiator to remove heat from the system to the surrounding air.

The rotation of the heat pipe can be done in various ways. One way, illustrated in FIGS. 1 and 2, is to have a notch or indentation 48 in the bent end portion 32 of the outside heat pipe positioned where the center axis of the middle portion 30 intersects the outer part of the bent end portion 32. This indentation, for example, could be a hex nut configuration. An access opening 50 in the solar panel permits a key or Allen wrench to be inserted into the indentation 48 to rotate the heat pipe. In the embodiment shown in FIGS. 1 and 2 a sprocket can be mounted on the heat pipe either next to the wall on the inside or outside and a chain mounted over the sprocket which hangs down on either side. By pulling the chain the heat pipe is rotated about its horizontal middle section. Another way to rotate the pipe is to have the outside solar panel attached to the end portion 32. Then the whole panel can be rotated either by manually turning the edges of the panel or by inserting a "key" into just the center part of the outside surface of the panel to rotate the assembly. Other techniques and mechanical linkages to rotate the heat pipe will be evident to those practicing the invention.

A further embodiment of the invention relates to the use of the device in cold climates where it is desired to prevent conductive heat losses through the heat pipe when it is not being used to transmit heat. For example, at night in the winter when the heat pipe is not functioning, there can be small heat losses from the warm inside of the house to the outside via the metal of the heat pipe. To prevent this loss, the middle portion of the heat pipe can be made of a material which has a lower thermal conductivity than the material making up the end portions which must have a high thermal conductivity. For example, the middle portion could be made of stainless steel. Another example could be a polymer material such as nylon. In selecting a polymer, the polymer must be strong enough to structurally withstand the force exerted on it due to the vacuum existing inside the heat pipe.

Figure 3:
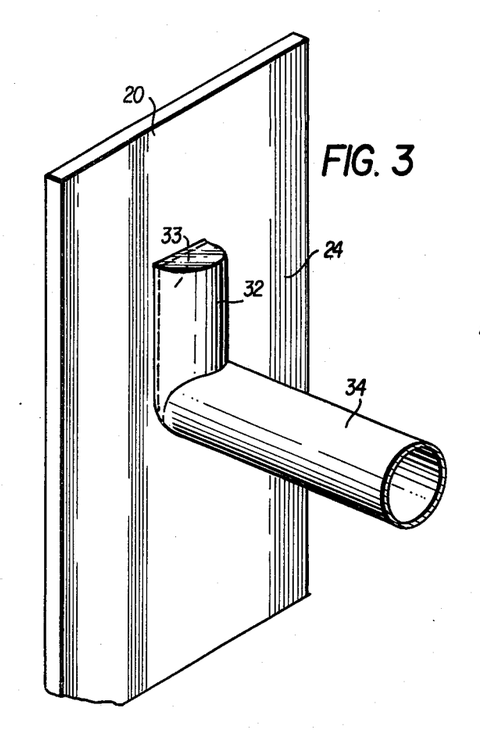
FIG. 3 is a perspective view of the end portion of the heat pipe and the back of the solar panel.

FIG. 3 illustrates another embodiment of the invention to provide maximum surface contact between the end portion of the heat pipe 32 with the outside solar panel 20. Here the extending end portion of the heat pipe has been cut in half with a flat piece of a high thermally conductive metal 33 secured to the two exposed sides of the pipe. The cross-section of the end portion is thus one-half of the normal circular cross-section. This construction provides a maximum area of contact between the flat surface of the back side of the solar panel 24 and the heat pipe to provide the optimum heat transfer by conduction.

The maximized surface contact embodiment shown in FIG. 3 has almost all of the heat being transferred into the heat pipe passing through the conductive end plate 33. This flat, conductive end plate 33 can be made of a highly thermally conductive material such as copper. Since copper is expensive, the remaining backside circular section of the end portion 32, as well as the middle portion 34 of the heat pipe, can be fabricated out of a less thermally conductive material, such as stainless steel to minimize costs.

To enhance the thermal contact between the back 24 of the solar panel 20 and the flat conductive plate 33 a thermal grease can be applied.

The thermal contact between the solar panel 24 and the liquid in the heat pipe can be further enhanced over the embodiment in FIG. 3 by eliminating the plate 33. In this embodiment the circular backside part of the end portion 32 would be joined directly to the back 24 of the solar panel 20. Under this modification the solar panel would have to be mounted for or be capable of rotation for those embodiments of the invention where it is desired to rotate the heat pipe since the attached solar panel would also be rotating.

Another embodiment for use of the device in the summer is to maintain the temperature of the outside solar panel lower than the temperature of the heat absorber in the building so the heat will transfer from the inside to the outside. One way to do this is to operate the device in the evening when the air temperature on the outside is cooler. When one desires to cool the building during the day, then the outside surface of the solar panel should be cooled. One way to do this is to shade it from the sun so the temperature of the surface and the air around it is at a temperature cooler than the temperature inside the building. A further way to maintain a cooler temperature for the surface of the solar panel is to spray cool water onto the surface. The evaporative effect of the water evaporating off the surface will absorb heat from the panel surface and cool it so as to permit further removal of heat from the inside of the building.

Another feature of the present invention is the ability to not only cause heat to be transferred in each direction, but also to be able to orient the heat pipe so there is no heat being transferred. In the embodiment where the two end portions or legs are oriented at an angle of about 90° to each other, it is possible to prevent heat transfer in the heat pipe by rotating the heat pipe so that both of these legs are extending up above a horizontal plane taken through the axis of the middle portion of the pipe. This will cause the fluid in the pipe to flow down into the middle portion of the pipe where it will serve as a vapor lock. Thus even if some vapor is generated, it would not be able to pass through the fluid filled middle portion of the pipe. In this configuration the vapor will probably not be generated since there is very little fluid contacting the solar panel 20 when it is the heat source or contacting the heat absorber 40 when it is the heat source.

Figures 4, 4A:
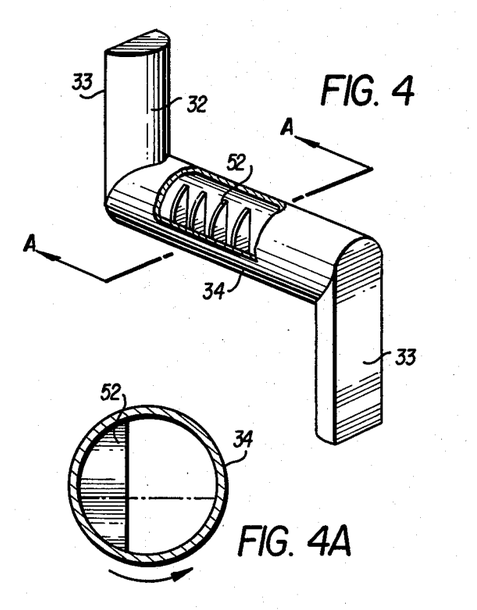
FIG. 4 is a perspective and partial view of the middle portion of the heat pipe with the liquid trap means.
FIG. 4A is a view taken along line AA of FIG. 4.

Another means to turn off the pipe when the two legs are at an angle of 180° is to form a series of depressions or blocking plates in the pipe at what will be the lowermost position of the pipe when the pipe is rotated so the two legs are in a horizontal plane. FIG. 4 illustrates these blocking plates 52 that form a chord over one segment of the circumferance as further seen in the end view of FIG. 4A. When the pipe is rotated in the direction of the arrow in FIG. 4A, the plates 52 will block the bottom part of the pipe and thus the liquid will not be able to flow back from one end to the other. Thus after all of the liquid on the hot side has vaporized and transferred to the cold side, the condensed vapor on the cold side will not be able to flow back to the hot side since it will be caught and retained within these depressions or plates. As a result the heat pipe is effectively turned off.

When it is later desired to have the heat pipe operate again, the pipe is rotated so the two legs are in a vertical orientation. The fluid will then flow out of the depressions or out from between the plates on to the next adjacent quadrant of the circumferance of the pipe which now is lower and which has a smooth uninterrupted surface. From here the liquid will then be able to flow down to the lowermost leg of the heat pipe to again permit normal operation of the pipe as discussed earlier.

Figure 5:
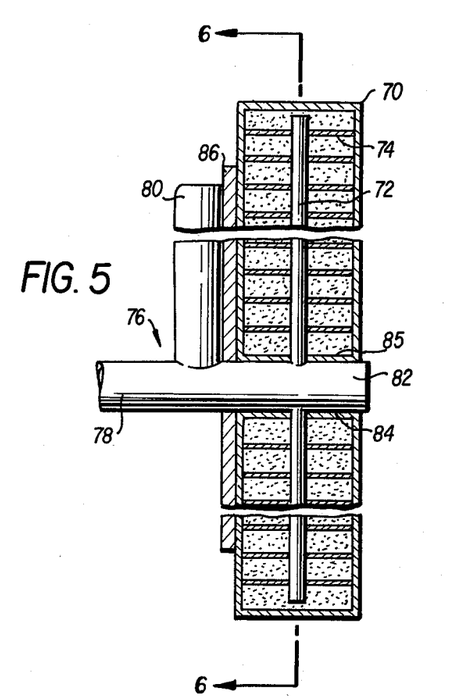
FIG. 5 is a cross-sectional view of one embodiment of the inside heat storage unit.

The inside heat absorber 40 can be designed in various configurations. In FIG. 1 it is shown with the end portion 36 of the heat pipe in contact with one side where there is a good intermediate heat transfer layer 42 and where the absorber has internal metallic trays 44 spaced apart in parallel rows to support layers of the crystallizable chemical. The distance apart is not critical. One possible spacing is to have the trays about $\frac{1}{4}$ inch apart. To provide additional heat into the heat absorber, the heat pipe can be extended as shown in FIG. 5 with extension piece 82 extending through opening 84 in the heat absorber 70. The heat produced from the condensation of the vapor in the extension piece 82 will be transmitted directly into the absorber through the metallic cylindrical wall 85 defining the opening 84 in addition to the heat being transmitted by the end portion 80 via plate 86 into the side of the absorber. To facilitate the transfer of the heat from the heat pipe extension 82, a metal rod or pipe 72 can be inserted both above and below the opening 84 in the heat absorber as shown in FIG. 5 and its end view, FIG. 6, with the top and bottom parts of the rod connected to the metallic cylinder 85. The end of extension piece 82 can have a notch or indentation arranged like element 48 in FIGS. 1 and 2 to permit rotation of the heat pipe.

Figure 7:
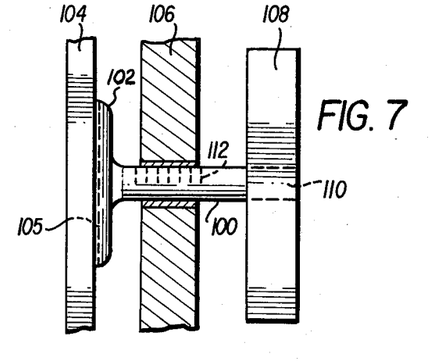
FIGS. 7-9 are cross-sectional views of the removable heat pipe embodiments.

A further feature of the present invention using the heat pipe to bring the heat from an outside solar panel directly through the wall of the building to an inside heat absorber is the ability to use a very simple and economical structure when it is only desired to have the heat transfer one way, such as from the outside to the inside. As shown in FIG. 7, the heat pipe 100 can have an enlarged heat absorbing end 102 in contact with an outside solar panel 104. The heat pipe passes through the wall of the building 106 and the opposite end 110 extends into a heat absorber 108 similar to the manner shown in FIG. 5. In the winter when it is desired to have heat brought into the heat storage unit 108, the device operates as discussed above with the liquid vaporizing in end 102 and condensing at end 110 where the heat transfers to the heat absorber 108.

When the heat pipe is being used in this replaceable mode where it is only left in place to deliver heat one way to the inside, then the configuration at the heat absorbing end is not limited to the otherwise preferred embodiment where the end portion is bent at 90° to the middle portion as in the configurations shown in FIGS. 1 and 3. Instead the end of the heat pipe in contact with the solar panel can have a large circular expansion as shown by the flared end portion 102 in FIG. 7.

Figure 8:
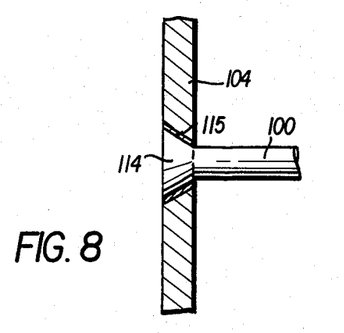
Figure 9:
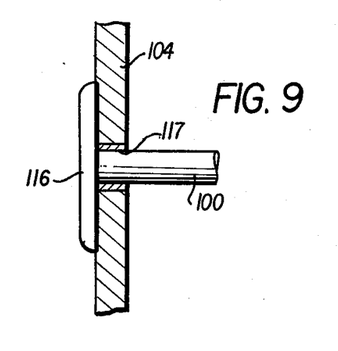

Other embodiments having a flared end portion are also possible. In FIG. 8 the flared end having a truncated cone configuration 114 will be in thermal contact with the complementary opening 115 in solar panel 104 so that the heat developed in the panel can be transferred by conduction into the end portion 114. In FIG. 9 the flared end portion 116 is on the outside of the solar panel 104 exposed to the sun. The middle portion of the heat pipe 100 will extend through the opening 117 in the solar panel and then it will pass through the wall of the building. The advantages of the configurations in FIGS. 8 and 9 is that the heat pipe can be removed without having to first remove the solar panel.

With regard to the embodiment shown in FIG. 7, the conductive surface 105 in contact with the back of the solar panel 104 can also be eliminated in the manner discussed above with the variation on the embodiment in FIG. 3 where plate 33 was removed. In this case with plate 105 removed the edges of the back part of the flared end portion 102 would be secured directly to the solar panel 104 and any removal of the heat pipe would involve the simultaneous removal of the solar panel.

The heat pipes of FIGS. 7, 8 and 9 can also have an off/on function by adding ridges or plates 112 in one side of the inner circumference of the heat pipe in the manner discussed with reference to FIG. 4. This is illustrated in FIG. 7. When the pipe is rotated so that this section is the lowermost portion of the pipe, these depressions or plates will prevent the return of liquid back to the hot end.

In summer when heat is not required inside the building, the heat pipe can be removed. In the embodiments shown in FIGS. 8 and 9, the heat pipe is directly pulled through the opening in the solar panel. In the embodiment shown in FIG. 7 the solar panel 104 is first removed. The heat pipe 100 can then be pulled directly out from the heat storage unit 108 through the wall 106 to the outside. In both cases a plug, not shown, can then be inserted in the wall in place of the heat pipe. Finally when winter returns, the heat pipe can be reinserted back in place and in the embodiment of FIG. 7 the solar panel reassembled in contact with the outside end 102 of the heat pipe.

Figure 6:
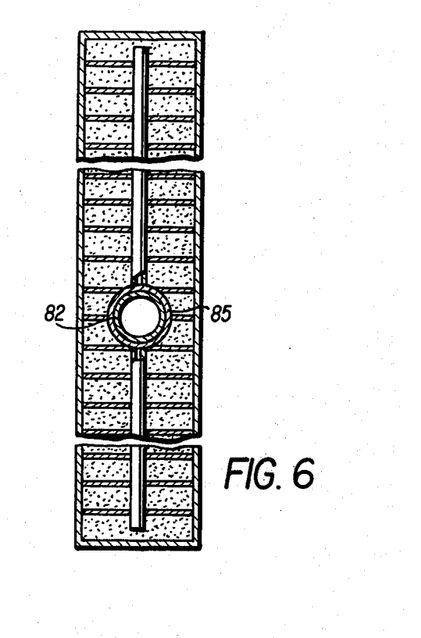
FIG. 6 is a sectional view taken along line 6—6 of FIG. 5.

A further feature of the replaceable heat pipe illustrated in FIGS. 7, 8 and 9 is the ability to increase the heat transferred into the storage unit by using either a metal rod configuration such as the rod 72 in FIGS. 5 and 6 or the use of an additional heat pipe inside the heat absorber.

Figure 10:
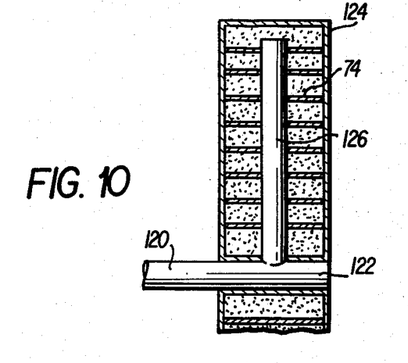
FIG. 10 is a cross-sectional view of a heat absorber with a heat distributing heat pipe.

This additional heat pipe embodiment is shown in FIG. 10 where the heat pipe 120 in contact with the solar panel has its opposite end 122 inserted into the lower section of a heat absorber 124. Extending up from the end 122 of the heat pipe is a second heat pipe 126. Thus the heat brought into the storage unit 124 from the outside heat pipe 120 is transferred to the vertically extending heat pipe 126 to disperse the heat up through the entire height of the heat absorber 124.

Figure 11:
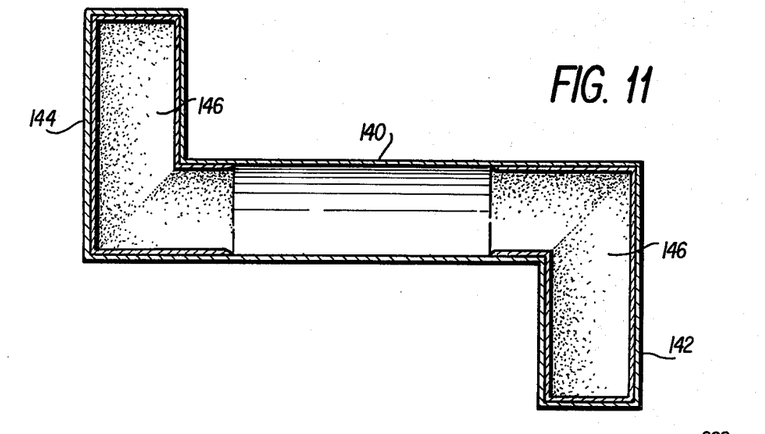
FIG. 11 is a cross-sectional view of a heat pipe with inside wicking material at each end.

In order to improve the heat transfer efficiency when the liquid at one end of the pipe is being vaporized, one embodiment of the present invention uses a wicking material on the inside of the pipe at the end portions where the heat transfer is taking place. As seen in FIG. 11, a heat pipe 140, having end portions 142 and 144, can have on the inside of the heat pipe in these end portions a wicking material 146. Although wicking material has been used in heat pipes to return liquid back to the end where vaporization occurs, such heat pipes employ the wicking material in the middle portion of the heat pipe. In the present embodiment, however, the wicking material is only being used in the end portions where heat is being supplied to the heat pipe. This wicking material uniformly distributes the heat into the liquid to avoid non-uniform boiling and "bumping".

Figure 12:
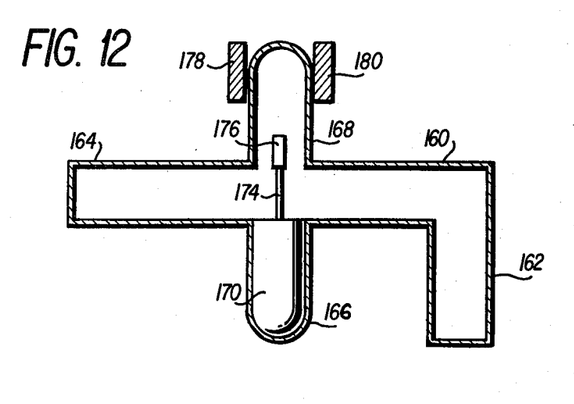
FIG. 12 is a cross-sectional view of a heat pipe with a trap and plunger in the middle.

Another embodiment of the invention is the construction of a heat pipe which is able to be turned off and on without having to rotate the pipe. Such an embodiment is useful when conveying heat over a large distance with long pipes or when the heat pipe is situated at a high point on a building where it is difficult to reach the pipe on the outside to insert a key to rotate it. This embodiment is illustrated in FIG. 12 where heat pipe 160 has one extending end portion 162 where solar energy will be applied to the pipe. In the mid-section of the pipe a trap chamber 166 extends below the pipe and another chamber 168 is located above the pipe. A plunger 170 is positioned in the lower trap chamber 166 and it substantially fills the volume of this chamber 166.

Attached to the plunger 170 is a connecting rod 174 which is connected to a metal element 176 made of a magnetizable material. Positioned on either side of the upper chamber 168 are electro-magnets 178 and 180. Alternatively a circular solonoid or other magnetic field-producing device could be employed positioned about the upper chamber 168.

In operation, with no electrical power supplied to the electro-magnets, the plunger 170 remains down in the chamber 166 and the fluid in the pipe is able to flow normally back from the condensing end 164 down to the extended end 162 for regular operation of the heat pipe as described earlier. When it is desired to stop the heat pipe operation, electricity is supplied to electro-magnets 178 and 180, which sets up a magnetic field that causes metal element 176 to move upwardly. This pulls the plunger 170 up by means of the connecting rod 174 so that trap chamber 166 is empty. Then as the vapor condenses at the end 164 and liquid begins to return back to the hot end 162, the liquid will first flow into chamber 166 where it will collect. Since the liquid does not return to end portion 162, the heat pipe will no longer operate. When it is later desired to have the heat pipe in operation, the electricity is turned off to the electro-magnets 178 and 180 and the plunger 170 drops back down into trap chamber 166 to displace the liquid out of the chamber 166 and back down into the end portion 162 where the liquid can again be vaporized.

Instead of using electro-magnets to raise up the metal element 176, a hand-held magnet can be used. To maintain the magnetizable body 176 in the upper position, which in turn keeps the plunger out of the trap chamber, a magnet holding means can be provided to maintain the magnet above the upper chamber. Alternatively the metal element can be maintained in the upper receiving chamber by a mechanical locking linkage. For example, the metal element could have a projection on one side with a ledge provided on one side inside the receiving chamber. The metal element could initially be raised with the magnet to the upper position and then rotated by turning the magnet so the projection would rotate and overhang the ledge. Then when the magnet is removed, the metal element will be maintained in the upper position by the projection engaging the ledge.

Figure 13:
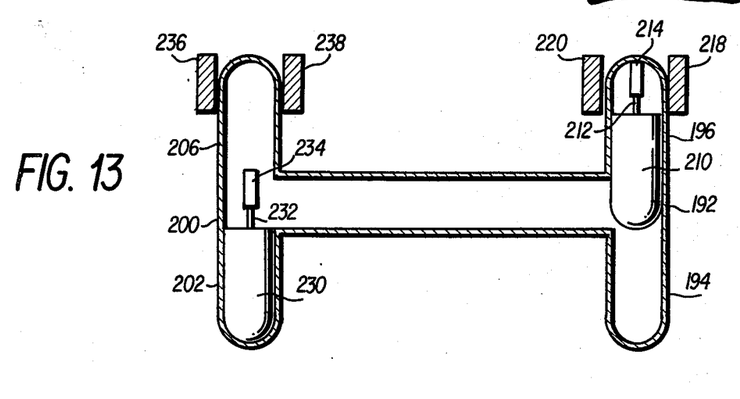
FIG. 13 is a cross-sectional view of a heat pipe with traps and plungers at each end.

Another variation of this on-off controlled heat pipe embodiment employing a trap chamber and a moveable plunger is shown in FIG. 13 where a trap chamber and associated plunger are positioned at each end. This embodiment also permits control of the direction of heat flow without rotating the pipe. In this figure the heat pipe 190 has one end 192 with lower trap chamber 194 and upper chamber 196. Positioned within these upper and lower chambers is a plunger 210 which is connected by rod 212 to the metal element 214 made of a magnetizable material. On either side of the upper chamber 196 are electro-magnets 218 and 220.

On the other end 200 of the heat pipe 190 is a lower trap chamber 202 with chamber 206 above it. Positioned within these two chambers is a plunger 230 connected by rod 232 to the magnetizable element 234. Positioned on either side of the upper chamber 206 are the electro-magnet units 236 and 238. Again, as discussed with reference to FIG. 12, a circular solenoid or other magnetic field-producing device could be employed positioned about the upper chambers 196 and 206. In the configuration shown in FIG. 13 the fluid of the heat pipe will collect down in the lower chamber 194 where it will vaporize. After the vapor condenses in the upper chamber 206 it will flow back down to chamber 194. In order to cause the heat pipe to operate in the opposite direction, plunger 210 can be lowered and plunger 230 raised. When heat is applied to the left end 200, then the liquid in trap chamber 202 will vaporize and the heat will transfer in a rightward direction to the opposite end 192.

Returning to the configuration shown in FIG. 13, the heat pipe is operating to transfer heat from end 192 over to end 200. If the temperature at end 192 drops below the vaporization temperature, such as at night, then the heat pipe will not operate since the cool liquid will remain in trap portion 194.

To make sure the pipe does not operate under any conditions between a hot end and a cold end, both plungers 210 and 230 can be raised so there is an empty trap in both lower chambers 194 and 202. Under this configuration the liquid will collect in whichever trap chamber is at the cooler temperature. Since there will be no liquid returning to the hot end, there will be no further operation of the heat pipe.

In most of the embodiments described so far the solar panel and heat absorber have been shown spaced from the wall to permit rotation of the bent ends of the heat pipe. However, these heat transfer systems can also operate with the solar panel and heat absorber either adjacent to or integral with the wall. In this unitary embodiment, indented spaces can be provided in the wall for the rotation of the bent ends of the heat pipe or for the trap chambers and electromagnets. In addition modular wall units can be built with the solar panel and heat absorber forming the two sides of the wall.

Figure 14:
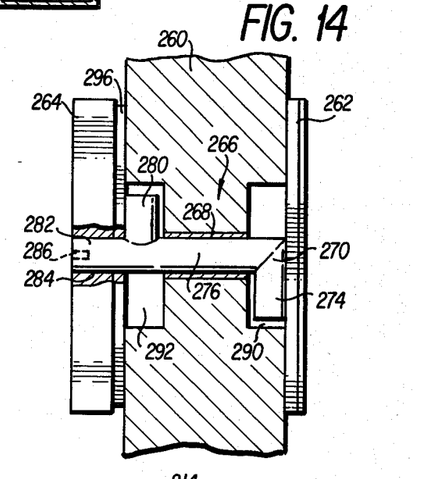
FIG. 14 is a cross-sectional view of a modular wall structure with the solar panel, heat pipe and heat absorber in one integral unit.

FIG. 14 illustrates one form of the modular wall unit using a heat pipe according to another embodiment of this invention. It will be apparent that all of the other heat pipe embodiments disclosed can also be used to transfer heat from one side to the other as well as using various internal structures disclosed for the heat absorbers.

In FIG. 14 the modular wall unit 260 has as one side an outside solar panel 262 made of a thermally conductive material. In addition to the metal plate elements disclosed earlier, this outside panel could also be made of conventional aluminum siding material with an appropriate smooth back, heat transfer surface. The use of aluminum siding is particularly advantageous in reducing the cost of the system. Since aluminum siding is normally used as the outer layer of a wall in building construction, there is no need to incur any further expense to provide an additional heat conductive solar panel.

The other side of the wall has a heat absorber unit 264 which can be of the types previously described with a phase change material therein. Between the solar panel and the heat absorber is an insulating type material 266 to provide rigidity to the wall and to insulate the inside from the outside. The insulating material has an opening 268 through which the heat pipe 270 is inserted. The heat pipe has one end portion 274 in contact with the back side of the solar panel, a middle portion passing through the insulation and the other end portion 280 extending from the middle portion of the heat pipe and in thermal contact with the heat absorber 264. In this embodiment the heat pipe also has an extension piece 282 extending into the heat absorber 264 through the opening 284 in the heat absorber. In order to rotate the heat pipe for its on-off function, a recessed area 286 can be provided at the end of the heat pipe to permit the insertion of a key or Allen wrench to rotate the pipe. Other pipe rotating means could also be employed, such as a handle. When the pipe is rotated, the end portion 280 will rotate in the opening 292 provided in the insulating material 266, and the other end portion 274 will rotate in the open space 290 which is also carved out of the insulating material 266. In order to increase heat transfer from the heat pipe end portion 280 to the heat absorber 264, a metal plate 296 can be attached to the side of the heat absorber 264.

In the embodiment shown in FIG. 14, there is only one heat pipe shown. It is apparent that such a modular unit could be built with a plurality of heat pipes spaced throughout the area of the wall. Similarly in the other heat pipe embodiments in FIGS. 1-13 there can be a plurality of heat pipes employed.

What is claimed is:

1. An apparatus to provide a heat exchange relationship across a generally vertical wall defining the inside and outside of a building, said wall having means for mounting a heat pipe at its middle portion for rotational motion of said heat pipe in said wall about said middle portion, said apparatus comprising
   a heat pipe having a middle portion passing through the wall with two closed ends, said ends being arranged with respect
      to a middle portion axis extending axially along the length of the middle portion of the heat pipe and
      to a plane passing through said axis
   so that one closed end extends only perpendicularly above the plane while the other closed end extends perpendicularly to the axis and only below the plane, said heat pipe being mounted in the wall to rotate about the axis of the middle portion of the pipe;
   a thermally conductive solar heat panel on the outside of the building and having the side facing the wall in thermal contact with one end portion of the heat pipe; and
   a thermally conductive heat absorber on the inside of the building and having the side facing the wall in thermal contact with the other end portion of the heat pipe, whereby when the end portion on the outside is extending downward solar heat is transferred to the inside of the building to warm the building, and when the heat pipe is rotated so the end portion on the inside is extending downward, the inside heat is transferred to the outside to cool the building.

2. The apparatus according to claim 1, wherein the thermally conductive heat absorber unit contains a material that undergoes a phase change upon heating and cooling.

3. The apparatus according to claim 2 wherein said material comprises Glauber's salt.

4. The apparatus according to claim 3, wherein said material further comprises 1-5 percent Borax.

5. The apparatus according to claim 3, wherein said material further comprises common salt.

6. The apparatus according to claim 1, wherein the heat pipe further comprises fluid blocking means on a segment of the inner circumference of the pipe.

7. The apparatus according to claim 1, wherein the direction of perpendicular extension of one end portion is 180° from the direction of perpendicular extension of the other end portion when viewed along the middle portion as the vertex.

8. The apparatus according to claim 1, wherein the thermally conductive heat absorber on the inside of the building is a container for a heat absorbing medium.

9. The apparatus according to claim 8, wherein the container has a layer of a thermally conductive material on its outside surface in contact with the extending end portion of the heat pipe.

10. The apparatus according to claim 1, further comprising means to rotate the heat pipe.

11. The apparatus according to claim 1, wherein the middle of the heat pipe passing through the wall is horizontal and the two end portions are vertical and extending in opposite directions.

12. The apparatus according to claim 1, wherein the heat pipe further comprises fluid blocking means on a segment of the inner circumference of the pipe at a position between where the two end portions extend.

13. The apparatus according to claim 1, wherein the two extending portions of the heat pipe form an angle between them when viewed along the middle portion as the vertex of less than 180° and whereby when both extending ends are positioned above the middle portion when the middle portion is held horizontal, heat will not pass through the pipe.

14. The apparatus according to claim 1, wherein each end portion of the heat pipe has a flat section on the side of the pipe to provide heat transfer to a flat surface.

15. The apparatus according to claim 1, wherein the heat pipe comprises a further extension piece, in axial alignment with the middle portion, extending past the one end portion in contact with the heat absorber, said extension piece being in fluid relation with the rest of the heat pipe, having its extended end capped, and extending into the heat absorber.

16. The apparatus according to claim 1 further comprising insulation means for insulating the solar panel to reduce heat losses to the atmosphere.

17. The apparatus according to claim 16, wherein said insulation means comprises a transparent cover means over the side of the solar panel facing the sun.

18. The apparatus according to claim 17, where the transparent cover means comprises a glass plate.

19. The apparatus according to claim 16, wherein the solar panel is spaced from the wall and said insulation means comprises an insulating layer attached to the side of the solar panel facing the wall and surrounding the adjacent extending end portion of the heat pipe.

20. The apparatus according to claim 1, wherein the middle portion is fabricated of a material having a lower thermal conductivity than the heat conducting material of the end portions.

21. The apparatus according to claim 1, wherein the end portions are lined with a wicking material.

22. A controllable heat pipe comprising a sealed tube containing a vaporizable fluid, said tube having a middle portion and two closed end portions with the portions at each end
   (a) being arranged with respect
      to a middle portion axis extending axially along the length of the middle portion of the heat pipe and
      to a plane passing through said axis
   so that one closed end extends only perpendicularly above the plane while the other closed end extends perpendicularly to the axis and only below the plane, and
   (b) forming a minimum angle between them when viewed along the middle portion as the vertex of at least 90°, said tube not requiring any wicking material through which the fluid transfers from one end to the other end.

23. The controllable heat pipe according to claim 22, wherein the amount of fluid in the pipe is selected so that when the middle portion is horizontal and one end portion is extending downward, all of the fluid is contained with the downward extending end with essentially no fluid in the middle portion.

24. The controllable heat pipe according to claim 22, wherein the angle between the two extending end portions is about 180°.

25. The controllable heat pipe according to claim 24, further comprising fluid blocking means on a segment of the inner circumference of the pipe at a position between where the two end portions extend.

26. The controllable heat pipe according to claim 22, wherein the two extending end portions form an angle between them when viewed along the middle portion as the vertex of less than 180° and whereby when both extending ends are positioned above the middle portion when the middle portion is held horizontal, heat will not pass through the pipe.

27. The controllable heat pipe according to claim 22, wherein each end portion has a flat section on the side of the pipe to provide heat transfer to a flat surface.

28. The controllable heat pipe according to claim 22, wherein the heat pipe further comprises an extension piece extending, in axial alignment with the middle portion, past one end portion with said extension piece being in fluid relation with the rest of the heat pipe and having its extended end capped.

29. The controllable heat pipe according to claim 22, wherein the middle portion is fabricated of a material having a lower thermal conductivity than the heat conducting material of the end portions.

30. The controllable heat pipe according to claim 22, wherein the end portions are lined with a wicking material.

* * * * *